(12) United States Patent
Chen et al.

(10) Patent No.: US 10,115,321 B2
(45) Date of Patent: Oct. 30, 2018

(54) HUMAN BODY CAVITY MODEL

(71) Applicant: Megaforce Company Limited, New Taipei (TW)

(72) Inventors: Wei-Hsuan Chen, New Taipei (TW); Wei-An Chen, New Taipei (TW)

(73) Assignee: MEGAFORCE COMPANY LIMITED, New Taipei (TW)

( * ) Notice: Subject to any disclaimer, the term of this patent is extended or adjusted under 35 U.S.C. 154(b) by 338 days.

(21) Appl. No.: 15/227,765

(22) Filed: Aug. 3, 2016

(65) Prior Publication Data

US 2018/0040261 A1 Feb. 8, 2018

(51) Int. Cl.
*G09B 23/30* (2006.01)
*H04N 9/31* (2006.01)
*G02B 26/08* (2006.01)
*G09B 5/02* (2006.01)

(52) U.S. Cl.
CPC ......... *G09B 23/30* (2013.01); *G02B 26/0833* (2013.01); *G09B 5/02* (2013.01); *H04N 9/3129* (2013.01)

(58) Field of Classification Search
CPC .. G09B 23/281; G09B 23/283; G09B 23/285; G09B 23/286; G09B 23/30; G09B 23/303; G09B 23/306; G09B 23/32; G09B 23/34; G09B 23/36; H04N 9/3129
See application file for complete search history.

(56) References Cited

U.S. PATENT DOCUMENTS

| 2,158,906 | A | * | 5/1939 | Netter | G09B 23/30 353/29 |
| 7,068,274 | B2 | * | 6/2006 | Welch | G06T 13/20 345/426 |
| 2006/0183096 | A1 | * | 8/2006 | Riener | G09B 23/30 434/276 |

* cited by examiner

Primary Examiner — Timothy A Musselman
(74) Attorney, Agent, or Firm — Chun-Ming Shih

(57) ABSTRACT

A human body cavity model comprises a first cavity and a second cavity. The first cavity includes a first cavity chamber, while a laser projector is disposed a first rear end of the first cavity chamber, and it includes an MEMS scanner for emitting scanning light beam. A light reduction element is disposed at the first front end near an opening port of the first cavity chamber, a reduction lens is disposed in front of the light reduction element, and a reflection mirror is provided at front end of the reduction lens. The second cavity is located opposite the first cavity, and having a second cavity chamber, in which a channel is formed into ear canal. A viewing port is provided at the second front end of the second cavity chamber, while an imaging plane is provided at the second rear end.

6 Claims, 1 Drawing Sheet

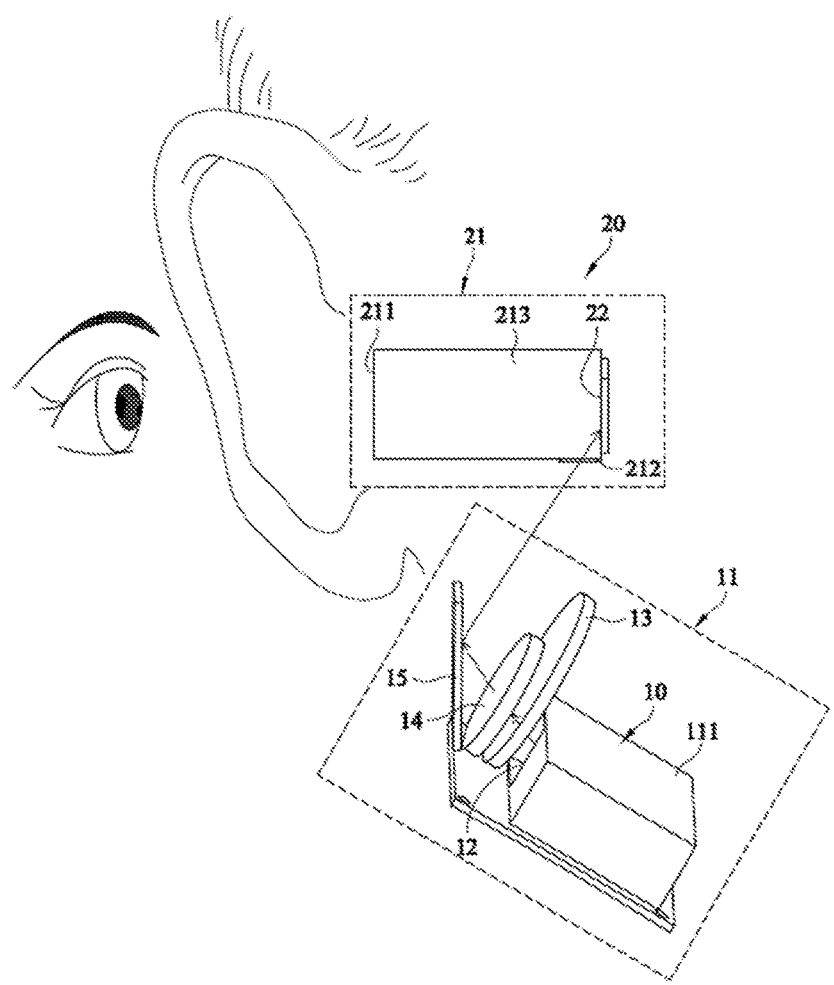

HUMAN BODY CAVITY MODEL

BACKGROUND OF THE INVENTION

Field of the Invention

The present invention relates to a cavity model, and in particular to a human body cavity model, used for projecting images on a 3-Dimentional ear canal model, so that a viewer may observe and learn various symptoms through looking at the images.

The Prior Arts

Projectors have been used widely for many years, to display static or dynamic images, or the contents stored in a computer. For example, in a meeting held in a big conference room, a projector can be used to project the contents stored in a notebook computer on a display screen, for viewing by a lot of attendees. Or, in a class room, a projector can be used to project teaching video stored in a notebook computer on a display screen, to help proceed with teaching.

In real life, both the internal ear canal and the external ear canal are of a 3-Dimentional shape rather than a planar shape. Therefore, for the type of planar image teaching tool, it is rather difficult to be familiar with the actual symptoms of the ears, as such adversely affecting the efficiency and effectiveness of teaching.

Therefore, presently, the design of the image projection device is not quite satisfactory, and it leaves much room for improvement.

SUMMARY OF THE INVENTION

An embodiment of the present invention is to provide a human body cavity model, comprising: a first cavity, including a laser projector disposed at a first rear end, wherein the laser projector comprises an MEMS (micro-electromechanical system) scanner for projecting a scanning light beam, and reflection mirror disposed at a first front end to reflect the scanning light beam; and a second cavity, comprising a second cavity chamber, while a second front end of the second cavity chamber is provided with a viewing port, and a second rear end of the second cavity chamber is provided with an imaging plane, such that the scanning light beam is reflected by the reflection mirror onto the imaging plane.

BRIEF DESCRIPTION OF THE DRAWINGS

The related drawings in connection with the detailed descriptions of the present invention to be made later are described briefly as follows, in which:

FIG. 1 is a schematic diagram of a human body cavity model according to an embodiment of the present invention.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Refer to FIG. 1 for a schematic diagram of a human body cavity model according to an embodiment of the present invention. As shown in FIG. 1, the human body cavity model comprises: a first cavity 11 and a second cavity 21. The first cavity 11 includes a first cavity chamber 111. A laser projector 10 is disposed at a first rear end of the first cavity chamber 111, and the projector 10 includes an MEMS (micro-electromechanical system) scanner (not shown) for projecting a scanning light beam to show various ear symptoms. An opening port 12 is disposed at the first front end of the first cavity chamber 111, so that the scanning light beam is able to pass through the opening port 12. A set of light transmission devices 13 and 14 are located at the front end near the opening port 12, in the first cavity chamber 111 of the first cavity 11. In the present invention, the set of light transmission devices 13 and 14 are a light reduction element 13, and a reduction lens 14 respectively. The light reduction element 13 is disposed at the first front end near the opening port 12. The reduction lens 14 is disposed in front of the light reduction element 13. A reflection mirror 15, in a reflection angle, is disposed in front of the reduction lens 14. At first, the scanning light beam is reduced by the light reduction element 13, then the image formed by the scanning light beam is reduced through the reduction lens 14, and then the scanning light beam is reflected by the reflection mirror 15.

The second cavity 21 is disposed in a position opposite and corresponding to the first cavity 11. In the second cavity chamber 213 of the second cavity 21, a channel is formed in an ear canal. And in the second cavity chamber 213 of the second cavity 21, a viewing port 211 is disposed at the second front end, and an imaging plane 22, such as a screen, is disposed at the second rear end. Therefore, the scanning light beam reflected by the reflection mirror 15 is able to pass through a passage port 212 at the bottom of the second rear end, to be projected to the imaging plane 22 in the second cavity chamber 213 of the second cavity 21.

Refer again to FIG. 1. As shown in FIG. 1, through the viewing port 211, the viewer may look at the images shown in the imaging plane 22, to learn the details about various symptoms of the ear. By reflecting, the laser light will not enter into the viewer's eye directly to avoid causing harms to the eye.

In an embodiment, the reflection angle of the reflection mirror 15 is 30 degrees backward.

Also, in an embodiment, there can be no gap between the first cavity 11 and the second cavity 21.

Further, in an embodiment, light reduction element 13 can be a polarizer.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A human body cavity model, comprising:
a first cavity, including a laser projector disposed at a first rear end, wherein the laser projector comprises an MEMS (micro-electromechanical system) scanner for projecting a scanning light beam, and a reflection mirror disposed at a first front end to reflect the scanning light beam; and
a second cavity, comprising a second cavity chamber, while a second front end of the second cavity chamber is provided with a viewing port, and a second rear end of the second cavity chamber is provided with an imaging plane, such that the scanning light beam is reflected by the reflection mirror onto the imaging plane.

2. The human body cavity model as claimed in claim 1, further comprising a light reduction element, disposed between the laser projector and the reflection mirror.

3. The human body cavity model as claimed in claim 2, further comprising a reduction lens disposed between the laser projector and the reflection mirror.

4. The human body cavity model as claimed in claim 1, wherein a passage port is disposed below the second rear end of the second cavity, such that the scanning light beam reflected by the reflection mirror is projected onto the imaging plane through the passage port.

5. The human body cavity model as claimed in claim 1, wherein no gap exists between the first cavity and the second cavity.

6. The human body cavity model as claimed in claim 1, wherein a reflecting angle of the reflection mirror is 30 degrees backward.

* * * * *